Nov. 2, 1954  J. E. HICKOK ET AL  2,693,175
METHOD AND MEANS FOR PREVENTING CARBURETOR ICING
Filed Aug. 23, 1950  2 Sheets-Sheet 1

John E. Hickok
Joseph E. Neudeck
Inventors

By W. O. T Hickman Attorney

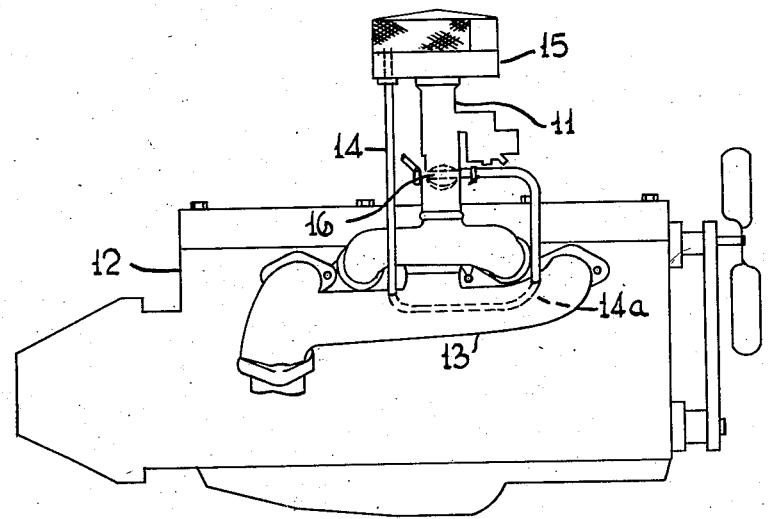
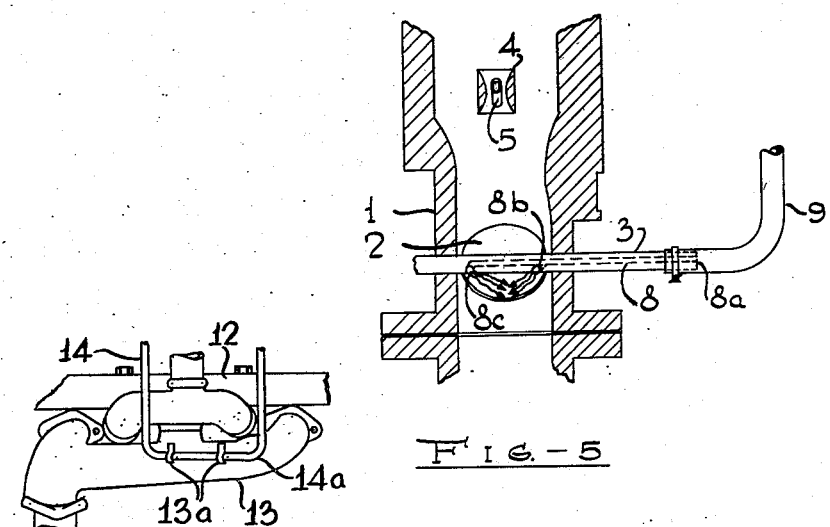

_United States Patent Office_

2,693,175
Patented Nov. 2, 1954

2,693,175

METHOD AND MEANS FOR PREVENTING CARBURETOR ICING

John E. Hickok, New Providence Township, Union County, and Joseph E. Neudeck, Union, N. J., assignors to Standard Oil Development Company, a corporation of Delaware Application August 23, 1950, Serial No. 180,984

14 Claims. (Cl. 123—122)

The present invention relates to a method and means for preventing ice formation in the carburetor of an internal combustion engine. More particularly, the invention relates to a method and means for introducing a stream of fuel-free air into surface contact with the throttle plate of an automotive carburetor to overcome ice formation on the plate and the adjacent walls of the carburetor.

Investigation of engine stalling during cool, humid or wet weather revealed the fact that with a properly adjusted carburetor such stalling was due primarily to the formation of ice on the upper surface of the carburetor throttle plate and the adjacent carburetor wall surfaces prior to the time when the engine and related metal parts had become warm enough to counteract the refrigeration effect of the gasoline evaporated during carburetion. Such investigation also determined that ice formation was most frequently encountered at atmospheric temperatures of from about 30° F. to about 50° F. with high relative humidity, with the most severe icing conditions encountered at temperaures of about 40° F. and 100% relative humidity. It was also found that the refrigerating effect of gasoline evaporated in a carburetor may be sufficient to cause reduction of the temperature of the air passing through the carburetor by as much as 50° F. below that of the entering air. This air temperature reduction in turn has a refrigeration effect on the metal parts of the carburetor. When sufficient moisture is present in the air, and the temperature of the metal parts is reduced to below about 32° F., ice begins to form, so that when the throttle is closed to an idling position, bridging occurs between the ice on the throttle plate and the carburetor walls, closing the narrow openings therebetween quickly, and sufficiently to restrict the normal flow of air to the engine, causing the engine to stall. Such ice formation and bridging has been found to be especially critical at the downstream edge of the throttle plate, and during periods of light load on the engine.

It is an object of the present invention to prevent ice formation in automotive engine carburetors. It is also an object of the present invention to counteract the auto-refrigeration effect produced by vaporization of volatile fuels during carburetion for combustion in internal combustion engines. It is a further object of the present invention to prevent carburetor ice formation by the introduction of fuel-free atmospheric air into a carburetor at critical points therein, and substantially independent of the air normally aspirated therethrough.

The invention and its objects may be more fully understood from the following description, when read in conjunction with the accompanying drawings in which:

Fig. 4 is a diagrammatic illustration of a system arranged and operatable according to the present invention;

Fig. 4a is a diagrammatic illustration of a portion of the system as shown in Fig. 4, illustrating a possible variation of the structural relationship of certain elements illustrated in Fig. 4; and Fig. 5 is a showing similar to that of Fig. 3 showing alternate means for introducing fuel-free air.

Figure 1:
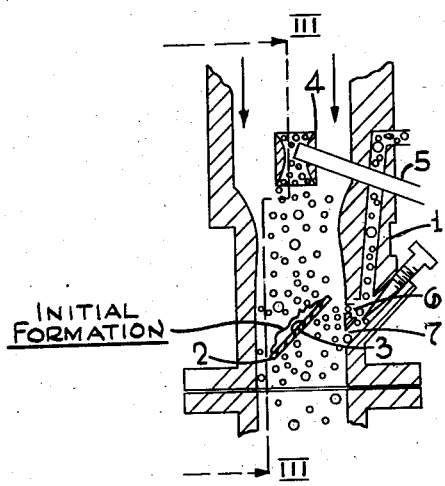
Fig. 1 is a semi-diagrammatic showing of a portion of a carburetor in vertical section, including fuel jets or ports and a throttle plate, and representative of light engine load operating conditions in which ice-formation may occur.
Figure 2:
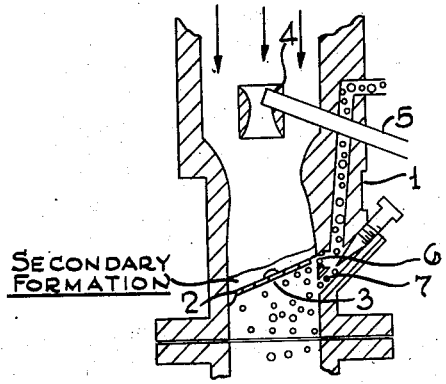
Fig. 2 is a similar illustration representative of the effect of ice-formation during idle operation of the engine under such conditions.
Figure 3:
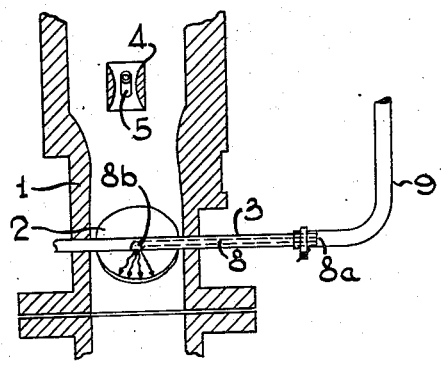
Fig. 3 is a vertical section through a portion of a carburetor along the line III—III of Fig. 1, including means for introducing fuel-free air according to the present invention.

Referring more specifically to the drawings, in Figs. 1 to 3 inclusive, the numeral 1 designates that portion of a carburetor body containing the throttle plate 2, throttle plate shaft 3, venturi 4, main or high speed jet 5, low speed port 6, and idle port 7. As illustrated in Fig. 1, the throttle plate is shown in a position approximately representing that for light load operation of an engine with which associated. In all respects, the representation is intended to be that of a standard automotive carburetor in which air is aspirated downwardly in the direction of the arrows from and through a conventional air cleaner device, not shown, and delivered to an engine in connection with vaporized volatile fuel by way of the usual intake manifold and valves, also in conventional fashion. None of the related structural elements is illustrated because of their conventional form and relationships.

When operated under the conditions of temperature and humidity previously mentioned, vaporization of the fuel drawn from the main or high speed jet 5 tends to reduce the temperature of the intake air and the carburetor parts, including that of the throttle plate 2 and the surrounding wall surfaces, to a point where moisture in the air is condensed and forms an ice deposit thereon, particularly on the throttle plate 2. Such deposit is designated by the letter X in Figs. 1 and 2.

During continuous light load operation, the icing described may have little effect on engine operation for the reason that the space between the throttle plate and wall surfaces is too great to be bridged or seriously reduced at the air flow velocity existing. When the engine speed is further reduced, however, as for idling operation, the space becomes small enough for the ice crystals to bridge it, creating a condition such as illustrated in Fig. 2.

It has been determined that the accumulation of ice on and immediately adjacent to the throttle plate of a carburetor is critical and is a direct cause of engine stalling. It has also been determined that such icing may occur when as little as 10% of the moisture condensed from atmospheric air aspirated through a carburetor is deposited as ice on the throttle plate and surrounding wall surfaces, with atmospheric air temperatures between about 30° F. and about 50° F., and with a high relative humidity, between about 70% and 100%. The ice thus deposited is that which must be reduced or eliminated. According to the present invention, this may be done by properly utilizing the heat content of a portion of the atmospheric air normally aspirated through the carburetor.

As heat of fusion of ice is 144 B. t. u. per pound, the heat required to prevent or substantially reduce critical ice formation will be 144X, where X represents the pounds of ice to be anticipated. Further, as this amount is equal to the amount of water converted to ice from that condensed by the refrigeration effect of fuel vaporized in the carburetor, X may be considered as being equal to 10% of the water condensed, in pounds per pound of air, under any specific operating condition. This heat requirement may be determined by conventional methods.

Illustrating the most severe condition contemplated, atmospheric air at 40° F. and 100% relative humidity will contain about 0.005212 pound of water per pound of air. If the temperature of this air, and the metal parts of the carburetor, be reduced to about 25° F., as by the refrigeration effect of fuel vaporization, the moisture content will be reduced to about 0.002826 pound of water per pound of air. Therefore, the difference, or 0.002386 pound of water per pound of air will be that which is condensed in the carburetor. If 10% of the condensed water is deposited as ice in the critical area of the carburetor, 0.0002386 pound of ice per pound of air will be formed, and the heat required to prevent or substantially reduce this ice formation will be 144 times 0.0002386, or 0.0344 B. t. u. per pound of air.

The heat content of atmospheric air at 40° F. will vary in direct relation to the relative humidity, and as the humidity increases, thereby tending to increase ice formation, the heat content also increases. The following table illustrates approximately the relationship between heat content and relative humidity.

| Atmospheric air at 40° F., and a Relative Humidity of— | Heat Content, B. t. u./# of air, above 32° F. |
|---|---|
| 70% | 6.0 |
| 80% | 6.5 |
| 90% | 7.0 |
| 100% | 7.5 |

Accordingly, under the operating conditions referred to, approximately 7.5 B. t. u. per pound of aspirated air would be available for the prevention or reduction of ice formation in the critical areas, as compared with the 0.0344 B. t. u. per pound of air required, and which requirement is less than .5% of the heat content of the air per pound.

Although the heat requirement may vary for any specific condition of air temperature and relative humidity within the critical ranges of temperature and humidity, as a practical matter the introduction of fuel-free air in amounts less than 0.5% would present mechanical and other problems which would complicate the method and apparatus unnecessarily. It is desirable therefore that to substantially prevent critical ice formation under any condition, fuel-free air be introduced according to the requirement for the most severe condition to be anticipated in normal operation, or not substantially less than 0.5% of the air aspirated through the carburetor. Preferably, about 1% of the atmospheric air aspirated by the carburetor will be introduced as a fuel-free stream of air in the manner set forth and illustrated. The upper limit of air available to supply the required heat will be determined by the operating characteristics of the carburetor to provide an air-fuel mixture to the engine.

According to the present invention, ice formation of the character described is substantially reduced or avoided by admitting a portion of the total atmospheric air normally aspirated through the carburetor of an internal combustion engine as a separate fuel-free stream of air, discharging and directing such stream of air into surface contact with the throttle plate and inner wall surfaces of the carburetor adjacent thereto. Preferably, the fuel-free air stream is discharged at a point or points along the axis of rotation of the throttle plate provided by the throttle plate shaft, and directed toward the peripheral edge of the plate so as to sweep the surface thereof. The fuel-free air may be discharged as a single stream or as a plurality of streams, and either or both upstream and downstream of the direction of flow through the carburetor. Preferably, the direction of discharge will be downstream toward a point on the peripheral edge of the throttle plate which lies in a line diametrically of the plate and perpendicular to the axis of rotation.

In Fig. 3 is illustrated a preferred means for introducing fuel-free air into surface contact with a throttle plate 2 and the adjacent wall area of the walls of a carburetor 1. As shown, the throttle plate shaft 3 is drilled to provide a passageway or bore 8, opening inwardly from the outer end 8a of shaft 8. The bore 8 may be calibrated to admit any desired percentage of combustion air to the carburetor as an independent fuel-free stream of air. The bore 8 communicates with a discharge port 8b formed in the shaft and opening outwardly therefrom to discharge onto the upper surface of the plate toward a point on one edge in a line diametrically of the plate and perpendicular to the throttle plate shaft 3. The outer end of the shaft may be connected in any conventional fashion, as by means of flexible tubing 9, to the interior of a conventional air cleaner, not shown, in order to avoid introduction of road dust and other foreign matter.

Under certain conditions it may even be desirable to connect the bore 8 with the air cleaner through a conduit including a metallic portion secured in contact with, or passed into and through a portion of the exhaust manifold, whereby the temperature of the de-icing air to be discharged into the carburetor, as previously described, may be raised above atmospheric temperature, increasing the de-icing effect. Such a system is illustrated diagrammatically by Fig. 4, in which the numeral 11 designates a carburetor associated with an engine 12, which has an exhaust pipe 13 connected therewith. A conduit 14 for de-icing air is connected at its inlet end to an air cleaner 15 for carburetor 11, and at its outlet or discharge end to a throttle plate shaft 16 for carburetor 11. An intermediate portion 14a of the conduit 14 is disposed interiorly of the exhaust pipe 13, as shown by dotted lines in the figure. A variation of the system as illustrated by Fig. 4 is shown in Fig. 4a, in which the intermediate portion 14a of the conduit 14 is attached to the exhaust pipe 13, in external surface contact therewith, as by means of clips 13a. In such a system, the temperature of the throttle plate and shaft, and even of surrounding carburetor wall surfaces, may be raised to some extent by indirect heat exchange and conduction.

In the arrangement as illustrated by Fig. 5, the throttle plate shaft bore 8 is provided with discharge ports 8c opening onto the surface of the plate at diametrically opposite points along the throttle plate shaft axis, and formed and arranged so as to provide for the discharge of at least two streams of fuel-free combustion air angularly across the plate in the direction of a point on the periphery thereof substantially equidistant from the respective ports and in a line diametrically of the plate and perpendicular to the throttle plate shaft axis.

In both Figs. 3 and 5, the preferred manner of introducing de-icing air is illustrated, in which the de-icing air is passed over the upper surface of a throttle plate, so as to flow toward the downstream edge, in the general direction of air flow through the carburetor. This has been found to be the most effective method, but the air may be discharged in an opposite direction, or from discharge ports opening against the under surface of the plate, some of the advantages of the invention still being retained. Furthermore, although illustrated as applied to a carburetor having a single plate and throat, it is intended that the invention shall be equally applicable in a carburetor employing more than one plate and throat. Also although the invention has been illustrated and described with specific reference to a downdraft carburetor structure, substantially the same arrangements and operating procedures may be applied to carburetors employing an updraft air intake.

What is claimed is:

1. A method for preventing ice formation in a carburetor for an internal combustion engine, comprising admitting a portion of the total atmospheric air aspirated through such carburetor, to provide a combustible mixture of air and fuel for said engine, as a fuel-free stream of air, and directing said air stream in the direction of flow of the mixture of air and fuel through said carburetor, first, into surface contact with a throttle plate controlling such flow and secondly with the internal surface wall portions of said carburetor adjoining the downstream edge of said plate.

2. A method according to claim 1, in which that portion of the total atmospheric air aspirated through the carburetor which is introduced as a fuel-free stream of such air comprises not less than about .5% of the total air aspirated.

3. A method according to claim 1, in which that portion of the total air aspirated through the carburetor which is introduced as a fuel-free stream of such air comprises 1% of the total air aspirated.

4. A method according to claim 1, in which the stream of fuel-free air is a portion of the total air aspirated through the carburetor having a total heat content per pound of air not less than 144 times 10% of the pounds of water condensed in said carburetor per pound of air aspirated therethrough.

5. In a carburetor for an internal combustion engine, including a throttle plate having a downstream peripheral edge portion, and a rotatable shaft support therefor, a means for substantially avoiding ice formation on said plate and the adjacent inner wall surfaces of said carburetor, comprising a conduit means extended into said carburetor, an inlet to said means for fuel-free atmospheric air disposed exteriorly of said carburetor and an outlet from said means interiorly of said carburetor, including at least one discharge port adjacent a surface of said plate opening from along the axis of said shaft toward a point peripherally of said plate on the downstream edge portion thereof, in a line diametrically of the plate and perpendicular to said shaft.

6. A means for substantially avoiding ice formation according to claim 5 in which said conduit means is a throttle plate shaft bore opening inwardly through said shaft, and a discharge port, communicating with said bore, disposed concentrically of said plate.

7. A means for substantially avoiding ice formation according to claim 5, in which said conduit means is a throttle plate shaft bore opening inwardly through said shaft, and at least one discharge port in said shaft communicating with said bore disposed adjacent a peripheral edge of said plate.

8. In combination with a carburetor for an internal combustion engine, including a throttle plate having a downstream peripheral edge portion, a rotatable shaft support therefor, having an outer end exteriorly of said carburetor, and a filter means for air entering said carburetor, a means for substantially avoiding ice formation on said throttle plate and adjacent interior wall surfaces of said carburetor, comprising a conduit passageway longitudinally within said throttle plate shaft, opening at one end through the outer end of said shaft, at least one discharge port opening from said passageway interiorly of said carburetor onto the surface of said throttle plate toward said downstream peripheral edge portion thereof, and conduit means for supplying fuel-free, filtered air from said filter means to the end of said conduit passageway opening through the outer end of said throttle plate shaft, said conduit means communicating at one end with said filter means and at the other end connected to the outer end of said throttle plate shaft and communicating with the conduit passageway therein.

9. A means for substantially avoiding ice formation on said throttle plate and adjacent interior wall surfaces of said carburetor, according to claim 8, in which said conduit means for supplying fuel-free filtered air to said conduit passageway is disposed for heat exchange relation with exhaust gases from an internal combustion engine with which said carburetor is operatively associated.

10. A conduit means according to claim 9, in which at least a portion of said means is disposed in direct surface contact with an exhaust manifold element connected to said engine.

11. A conduit means according to claim 9, in which at least a portion of said means is disposed interiorly of an exhaust manifold element connected to said engine.

12. In an internal combustion engine carburetor having an induction passage with a throttle therein, a shaft for said throttle, a bore extending longitudinally of said throttle shaft, a conduit adapted to be connected to a source of heated air communicating with said bore near one end thereof, and a port connecting the induction passage on the engine side of the throttle with the other end of said bore.

13. In an internal combustion engine carburetor having an induction passage with a throttle therein, a shaft for said throttle, a bore extending longitudinally of said throttle shaft, a conduit adapted to be connected to a source of heated air communicating with said bore near one end thereof, and a port connecting the induction passage on the engine side of the throttle with the other end of said bore, said source of heated air comprising means for conducting air in heat exchange relation with an engine exhaust manifold element.

14. In a carburetor for internal combustion engines having an induction passage, a throttle valve in said induction passage, and a shaft for said throttle valve, means for substantially avoiding ice formation on said throttle valve and adjacent wall surfaces of said induction passage, comprising a bore extending longitudinally of said throttle valve shaft, an inlet to said bore for atmospheric air, said inlet disposed exteriorly of said induction passage, an outlet from said bore disposed interiorly of said induction passage, including at least one discharge port opening into said induction passage substantially in the direction of flow therethrough.

References Cited in the file of this patent

UNITED STATES PATENTS

| Number | Name | Date |
| --- | --- | --- |
| 1,886,787 | Buraglia | Nov. 8, 1932 |
| 2,088,464 | Chandler et al. | July 27, 1937 |
| 2,269,706 | Brown | Jan. 13, 1942 |